Nov. 8, 1966 W. POSCHENRIEDER 3,284,728

ELECTROMECHANICAL FILTER

Filed Sept. 21, 1962

Inventor.
Werner Poschenrieder.
By [signature] Atty.

United States Patent Office 3,284,728

Patented Nov. 8, 1966

3,284,728

ELECTROMECHANICAL FILTER

Werner Poschenrieder, Munich, Germany, assignor to Siemens & Halske Aktiengesellschaft, Berlin and Munich, Germany, a corporation of Germany Filed Sept. 21, 1962, Ser. No. 225,970

Claims priority, application Germany, Sept. 22, 1961, S 75,881

1 Claim. (Cl. 333—71)

The invention disclosed herein is concerned with an electromechanical band filter with at least two mechanically coupled resonators and a transmission output supplemented to a parallel resonance circuit from which a capacitive coupling is conducted to the filter input.

Electromechanical band filters comprising, for example, two or more mechanically coupled quartz resonators have been known for some time. Such filters have as a rule sharply defined pass and cutoff ranges, but it is difficult to steepen the flanks of the pass band. The U.S. Patent No. 2,774,042 proposes a solution for the problems involved, by suggesting in connection with such a filter the production of an attenuation pole, but the corresponding arrangement has the drawback that the pole frequency is in a fixed ratio to the pass band frequency, that is, it is not freely selectible. Accordingly, such measures are in practice avoided and the number of mechanical resonators is instead appreciably increased.

Another way of producing, in connection with mechanical filters, attenuation poles has meanwhile been found, suggesting that a parallel resonance circuit be connected as a transverse conductance means respectively to the input and to the output of the mechanical filter, and that the parallel resonance circuit at the output side be substituted by a transformer with a transformation ratio of 1:1. A maximum of attenuation above and below the transconductance range can be obtained by pole formation, by a capacitive overcoupling from the secondary winding of such transformer to a given one of the two input lines, which is equivalent to a steepening of the filter flanks. However, the drawback of this known arrangement resides in that the input impedance of the filter is of low resistance in the cutoff range, whereas many cases of application call for a high impedance input in the cutoff range. It would of course be possible to meet the requirement for a high impedance input in the cutoff range, by serially disposing in connection with such a filter a further input network, but the expenditure required in such a case would be relatively high as compared with the result achieved.

The object of the invention is to provide an electromechanical filter of the type last noted above, wherein the requirement for a high impedance input is fulfilled in considerably simpler manner.

According to the invention, this object is realized in connection with an electromechanical band filter with an even number of coupled mechanical resonators and a transmission output supplemented to a parallel resonance circuit, from which a capacitive coupling extends to the filter input, by connecting ahead of the mechanical resonator, at the filter input, a series resonance circuit comprising a coil and a capacitor, and by effecting the capacitive coupling from the filter output to the input between the series circuit and the successively disposed resonator and by extending from the corresponding place a transverse capacitance to the other input line.

Further details of the invention will appear from the description which is rendered below with reference to the accompanying drawing.

Figure 1:
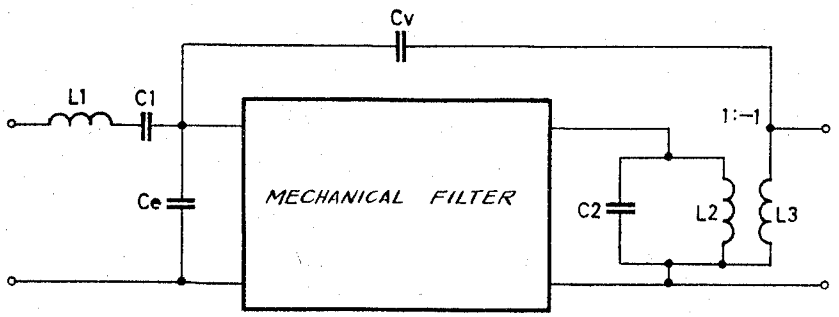
FIG. 1 shows an example of a circuit according to the invention.

The mechanical filter is merely schematically indicated in FIG. 1. It may comprise, for example, two mechanically coupled mechanical resonators. The first and the last mechanical resonator is respectively provided with two electrical terminals of known construction. In one of the leads to the input of the electromechanical filter is disposed a series resonance circuit, comprising a coil L1 and a capacitor C1, and a transverse capacitance *Ce* is provided at the input of the mechanical filter. A parallel resonance circuit, comprising the coil L2 and the capacitor C2, is placed as a transverse branch on both output lines, whereby such circuit may be formed, at least in part, by the output capacitance of the mechanical filter or the output transducer thereof, respectively. Both resonance circuits are tuned approximately to the band center frequency of the pass band. The parallel resonance circuit L2, C2 at the output side is supplemented to form a transformer, for example, by the provision of a secondary winding L3, such transformer having a transformation ratio of $1:-1$. From this transformer extends an opposed phase capacitive coupling *Cv* to the input line of the mechanical filter which contains the series resonance circuit, the transverse capacity *Ce* forming at this point a transverse branch for both input lines. This transverse capacity can be formed, at least in part, by the input capacity of the electromechanical filter.

Figure 2:
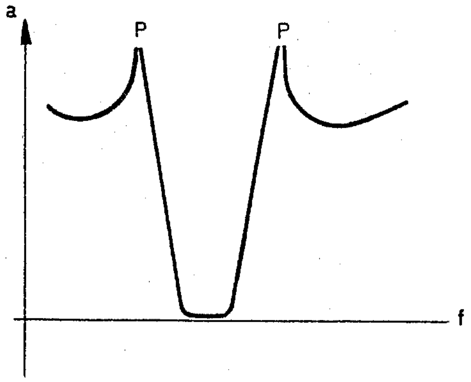
FIG. 2 shows the curve of the transmission attenuation.

The course which is obtained in such a filter for the transmission attenuation *a*, dependent upon the frequency *f*, is shown in FIG. 2. There are, so far as the frequency is concerned, above and below the pass band attenuation poles *p*. The series input circuit of the filter assures that the input impedance of the filter is in the cutoff range of high impedance while being in the pass band low according to the desired terminal impedance. The position of the attenuation poles, with respect to the frequency, is adjustable by appropriate dimensioning of the capacity value of the coupling capacitor *Cv*. The greater this capacity value is, the nearer will the pole frequencies lie to the borders of the pass band in the cutoff region.

Changes may be made within the scope and spirit of the appended claim which define what is believed to be new and desired to have protected by Letters Patent.

I claim:

In an electromechanical band filter, the combination of a mechanical filter structure comprising an even number of mechanically coupled mechanical resonators, a series resonance circuit comprising a coil and a capacity connected ahead of the input of said mechanical filter structure, a parallel resonance circuit forming a transverse branch across the output of said filter structure, an output coil, supplementing said parallel resonance circuit and forming a transformer having a transformation ratio of $1:-1$, capacitive coupling means extending from said output coil to a point lying between said mechanical filter structure and said series resonance circuit, and means, forming a transverse capacitor, extending from said point to the other input line, the resonance frequencies of the series resonance circuit and the parallel resonance circuit lying approximately at the middle of the frequency band of the mechanical filter structure.

References Cited by the Examiner

UNITED STATES PATENTS

| | | | |
|---|---|---|---|
| 1,976,481 | 10/1934 | Castner | 333—7 |
| 2,001,387 | 5/1935 | Hansell | 333—72 |
| 2,248,776 | 7/1941 | Och | 333—72 |
| 2,249,440 | 7/1941 | Sykes | 333—72 |
| 2,271,200 | 1/1942 | Mason | 333—72 |
| 2,756,395 | 7/1956 | Klinkhammer | 333—71 |
| 2,770,782 | 11/1956 | Roberts | 333—71 |

HERMAN KARL SAALBACH, *Primary Examiner.*

C. BARAFF, *Assistant Examiner.*